United States Patent [19]

Krofchak

[11] Patent Number: 5,626,646
[45] Date of Patent: May 6, 1997

[54] METHOD OF RECOVERING METALS AND PRODUCING A SECONDARY SLAG FROM BASE METAL SMELTER SLAG

[75] Inventor: David Krofchak, Oakville, Canada

[73] Assignee: Fenicem Minerals Inc., Copper Cliff, Canada

[21] Appl. No.: 663,724

[22] Filed: Jun. 14, 1996

Related U.S. Application Data

[63] Continuation-in-part of Ser. No. 494,665, Jun. 26, 1995, Pat. No. 5,593,493.

[51] Int. Cl.$^6$ .................................................. C21B 15/00
[52] U.S. Cl. ......................... 75/500; 75/627; 75/629; 75/640; 106/789; 501/155
[58] Field of Search ......................... 106/714, 789; 501/155; 266/215; 75/424, 425, 629, 640, 641, 643, 500, 627; 420/582

[56] References Cited

U.S. PATENT DOCUMENTS

| | | | |
|---|---|---|---|
| 3,857,700 | 12/1974 | Ammann et al. | 75/640 |
| 4,001,011 | 1/1977 | Agarwal et al. | 75/500 |
| 4,036,636 | 7/1977 | Ammann et al. | 75/643 |
| 4,043,804 | 8/1977 | Lindblad | 75/424 |

*Primary Examiner*—Michael Marcheschi
*Attorney, Agent, or Firm*—Rogers & Scott

[57] ABSTRACT

A method of recovering metals and producing a secondary slag from base metal smelter slag produced by a copper or nickel smelter includes mixing the smelter slag with at least one reducing agent selected from the group consisting of carbon and aluminum, said carbon (if present) being from about 1% to about 10% by weight of the slag and said aluminum (if present) being from about 5 to about 30% by weight of the slag, and with from zero to about 60% calcium oxide by weight of the slag. The mixture is heated above the eutectic melting point thereof directly and to ignition temperature aluminothermically (if aluminum is present as reducing agent) to reduce the iron silicate to ferrosilicon containing substantially all the copper, nickel and cobalt which was in the smelter slag and form a secondary slag comprising at least one compound selected from the group consisting of calcium silicate, calcium aluminate and calcium iron aluminum silicate. The ferrosilicon is then separated from the secondary slag.

6 Claims, No Drawings

METHOD OF RECOVERING METALS AND PRODUCING A SECONDARY SLAG FROM BASE METAL SMELTER SLAG

This invention is a continuation-in-part of U.S. patent application Ser. No. 08/494,665 filed Jun. 26, 1995, U.S. Pat. No. 5,593,493.

FIELD OF THE INVENTION

This invention relates to the recovery of metals and production of a secondary slag from base metal smelter slags produced by copper or nickel smelters.

BACKGROUND OF THE INVENTION

Copper and nickel concentrates are usually processed in a smelter which melts the concentrate to form a metallic matte and a slag essentially composed of iron silicate containing small amounts of valuable metals such as copper, nickel and cobalt.

In Canada, smelters produce over 12 million tons of iron silicate slags often containing up to about 0.7% copper, 1% nickel and 0.25% cobalt. Since 1900, some uses for these slags have been found, such as for rail ballast, road base and backfill, but such known uses have not been sufficient to utilize the amount of slag produced.

Considerable research has been carried out to attempt to lessen the amount of metals lost in the slag and/or to recover these metals from the slag. So far as is known, no economically viable process has been found to recover these lost metals, and as a result large slag heaps have accumulated adjacent to the smelters.

As water pollution control standards have developed, it has been found that the large slag heaps are leaching unacceptably high amounts of heavy metals, and mining companies are seeking acceptable solutions to this growing problem. Also, environmental authorities are demanding that plans be filed with the appropriate government agencies to provide commitments for long term permanent solutions to this problem.

It is therefore an object of the invention to provide a method of treating base metal smelter slag to recover metals and produce a secondary slag.

SUMMARY OF THE INVENTION

According to the invention, a method of recovering metals and producing a secondary slag from base metal smelter slag produced by a copper or nickel smelter, the smelter slag comprising iron silicate and other metallic compounds and elements including (by weight):

from about 15% to about 40% $SiO_2$ from about 1% to about 8% $Al_2O_3$s from about 35% to about 60% $Fe_2O_3$ from about 2% to about 20% CaO from about 1% to about 3% MgO from about 0.2% to about 1% Cu from about 0.1% to about 1% Ni (when from a nickel smelter)

from about 0.1% to about 0.3% Co from about 0.2% to about 2% S comprises mixing the smelter slag with at least one reducing agent selected from the group consisting of carbon and aluminum, said carbon (if present) being from about 1% to about 10% by weight of the slag and said aluminum (if present) being from about 5 to about 30% by weight of the slag and with from zero to about 60% calcium oxide by weight of the slag, heating the mixture above the eutectic melting point thereof directly and to ignition temperature aluminothermically (if aluminum is present as reducing agent) to reduce the iron silicate to ferrosilicon containing substantially all the copper, nickel and cobalt which was in the smelter slag and form a secondary slag comprising at least one compound selected from the group consisting of calcium silicate, calcium aluminate and calcium iron aluminum silicate, and separating the ferrosilicon from the secondary slag.

The ferrosilicon containing copper, nickel and cobalt can be used in smelters as a reducing agent. The secondary slag may be crushed and ground to a size suitable for use as aggregate for concrete, refractory aggregate and various grades of cement.

The base metal smelter slag may be poured in a molten state into a refractory lined vessel containing a prepared mixture of said reducing agent and calcium oxide (if present) in the required amounts to produce said ferrosilicon and said secondary slag.

The reducing agent may comprise carbon which together with said smelter slag and said calcium oxide (if present) is melted in the furnace to produce iron containing copper, nickel and cobalt and, when sufficient carbon has been added, to produce said ferrosilicon and said secondary slag comprising calcium silicate.

The composition of the ferrosilicon with respect to its silicon content may be varied by adjusting the amount of reducing agent added to the smelter slag.

The calcium oxide (if present) may be provided as a mixture of calcium carbonate and calcium oxide or as calcium carbonate.

The smelter slag may be poured in a molten stage over the reducing agent in the form of aluminum metal in a fused alumina lined pit to produce said secondary slag containing essentially fused alumina for use in high temperature refractories while simultaneously recovering said ferrosilicon containing copper, nickel and cobalt.

Scrap iron may be added to the smelter slag and reducing agent to produce a desired Fe:Si ratio in the ferrosilicon.

In a modification of the above described method, the method may be conducted in two stages by first adding a minimum amount of reducing agent sufficient to produce a metal phase comprising iron containing about 95% of the contained copper, nickel and cobalt, removing this metal phase, and then adding more reducing agent to produce ferrosilicon substantially free of copper, nickel and cobalt and said secondary slag comprising calcium aluminate or a calcium iron aluminum silicate compound.

Examples of the invention will now be described.

EXAMPLES OF THE INVENTION

Example 1

A composite sample of base metal silicate slag was obtained from a slag heap accumulated over 50 years from Inco's smelter at Sudbury, Ontario, Canada. This is one of the largest smelters in the world and produces some 1,200,00 tons of slag per year. Analysis of the slag (by weight) was:

| Fe | 36% | Mg | 1% |
| --- | --- | --- | --- |
| Si | 15% | Cu | 0.2% |
| Al | 3% | Ni | 0.4% |

3
-continued

| | | | | |
|---|---|---|---|---|
| Ca | 2% | Co | 0.2% | |
| S | 1.5% | | | |

Furnace Charge

| | | |
|---|---|---|
| Smelter Slag | 400 g | |
| Al | 120 g | (30% of smelter slag) |
| CaO | 240 g | (60% of smelter slag) |
| | 760 g | |

Note 1: The charge was selected to produce high grade Ferrosilicon and high grade calcium aluminate.
Note 2: % are by weight of the slag.

A clay crucible lined with calcium aluminate refractory cement was used to avoid contamination of the secondary slag. The crucible was heated until ignition of aluminothermic reaction commenced. The entire melt test was over in 15 minutes, and the final temperature was in excess of 4000° F. After 3 hours cooling, the sample was removed from the crucible, the ferrosilicon metal button of the secondary slag were separately weighed.

Products

| | |
|---|---|
| Secondary Slag | 580 g |
| Metal Button | 180 g |
| | 760 |

Note 1: This balances with the charge.
Note 2: Metal button was 45% of the original slag.

| | Recovered Metal Button (Ferrosilicon) | Secondary Slag (Calcium Aluminate) |
|---|---|---|
| Fe | 70% | 1% |
| Si | 24% | 4% |
| Al | 1% | 22% |
| Ca | 0.2% | 34% |
| Mg | 0.01% | 2% |
| Cu | 0.4% | <0.01% |
| Ni | 0.8% | <0.01% |
| Co | 0.3% | <0.01% |
| S | 0.1% | 1% |

Observations and conclusions from this test are:

a) The smelter slag was completely reduced to usable products, ie.: Ferrosilicon (Fe.Si) with a silicon content of 24% and a high quality calcium aluminate secondary slag.

b) Virtually all the base metals, namely Cu, Ni and Co, reported to the Ferrosilicon and only 0.01% remained in the calcium aluminate slag.

c) A comparison of calcium aluminate produced by cement companies which manufacture calcium aluminate confirms the high quality produced in this example as follows:

| | Secondary Slag (Calcium Aluminate) | A Cement Company's Calcium Aluminate |
|---|---|---|
| $Al_2O_3$ | 41% | 39% |

4
-continued

| | Secondary Slag (Calcium Aluminate) | A Cement Company's Calcium Aluminate |
|---|---|---|
| CaO | 49% | 38% |
| $SiO_2$ | 9% | 5% |
| $FeO_3$ | 2% | 16% |
| MgO | 1% | 0.2% |
| S | 1% | 0.2% | d) This example was selected because it uses the maximum amount of aluminum reducing agent to produce the maximum amount and highest value of products from the base metal slag. There would be no benefit in adding more reducing agents.

Numerous other experiments have been conducted using progressively less reducing agent and CaO and also repeating many of the experiments (in total some 47 experiments), all of which produced results that stoichiometric calculation would have expected, thus assuring predictability of the invention to produce consistently reliable results.

Accordingly, it is understood that many variations may be made to the above described exemplary process, typical of which are the following examples using progressively less reducing agents. The same composite sample of slag was used for all tests and so the analysis of the base metal slag was the same as that shown in Example 1 for all test examples.

| Example Number | 2 | 3 | 4 | 5 | 6 |
|---|---|---|---|---|---|
| | all in grams | | | | |
| Smelter Slag Charge | 100 | 100 | 100 | 100 | 100 |
| Aluminum | 10 | 15 | 20 | 25 | 30 |
| Calcium Oxide | 20 | 30 | 40 | 50 | 60 |
| Total Weights | 130 | 145 | 160 | 175 | 190 |
| Metal Buttons from Melts | 26 | 32 | 40 | 44 | 48 |
| Analysis of Metal Buttons % by weight | | | | | |
| Fe | 90 | 83 | 75 | 70 | 70 |
| Si | 4 | 9 | 15 | 20 | 24 |
| Al | 0.1 | 0.3 | 0.7 | 1 | 1.3 |
| Ca | 0.6 | 0.7 | 0.6 | 0.7 | 0.7 |
| Mg | 0.3 | 0.2 | 0.3 | 0.3 | 0.3 |
| Cu | 0.8 | 0.6 | 0.5 | 0.45 | 0.4 |
| Ni | 1.6 | 1.2 | 1.0 | 0.9 | 0.8 |
| Co | 0.8 | 0.6 | 0.5 | 0.45 | 0.4 |
| S | 2 | 2 | 1.7 | 1.5 | 1 |
| | all in grams | | | | |
| Secondary Slag | 102 | 113 | 120 | 130 | 141 |
| Analysis of Secondary Slags % by weight | | | | | |
| Fe | 15 | 9 | 4 | 3 | 2 |
| Si | 15 | 11 | 8 | 6 | 4 |
| Al | 11 | 14 | 16 | 18 | 22 |
| Ca | 15 | 19 | 23 | 27 | 34 |
| Mg | 2 | 2 | 2 | 2 | 2 |
| Cu | <0.05 | <0.05 | <0.05 | <0.05 | <0.05 |
| Ni | <0.04 | <0.04 | <0.04 | <0.04 | <0.04 |
| Co | <0.02 | <0.02 | <0.02 | <0.02 | <0.02 |
| S | 0.7 | 0.8 | 0.9 | 1 | 1.3 |

It will be understood by those skilled in the art that the elemental analysis shown are in the slag as metal oxides and not as metal elements as in the metal button.

For examples 2–6, the analysis were approximate because they were carried out with an X-Ray multi-element system which was not calibrated for some of these particular elements. Nevertheless, the figures illustrate proportional increase of metal recovery versus the amount of aluminum reducing agent used and, with respect to the secondary slags, varying compositions of Fe, Si, A and CaO which would for each of examples 2,3,4,5 and 6 have different cementitious and refractory properties.

Example 7

This example was designed to show that, if carbon is added together with aluminum, the combined effect is to increase the metal yield. To show this, two melt tests were conducted using exactly the same ingredient weights except that, in the second test, some carbon was added as follows:

|  | Test 1 | Test 2 |
| --- | --- | --- |
| Weight of Base Metal Slag | 100 g | 100 g |
| Aluminum | 10 g | 10 g |
| Calcium Oxide | 20 g | 20 g |
| Carbon | none | 3 g |
|  | 130 g | 133 g |
| After melting, wt. of metal produced | 26 g | 29 g |

The test with carbon produced 11.5% more metal. This is an important example of the invention because carbon is substantially less costly than aluminum and therefore the ability to use some carbon enhances the economics.

Example 8

A sample of the secondary slag, identified as Calcium aluminate, and as produced in Example 1, was crushed to −¼ inch down to 0 and a sample of this was in turn ground to about 325 mesh. Then, 4 parts by weight of the −1/4 inch crushed slag was mixed with 1 part by weight of the 325 mesh material and water added in the amount of 0.3 water cement ratio.

The mixture was then cast into 2 inch cubes and allowed to set. After 24 hours, the compressive strength was 4900 psi. A 2 inch cube was placed in a gas fired furnace and heated to about 2400 degrees F. for several hours. After cooling, the cube still had its structural integrity and had changed its colour from the original grey colour to a straw yellow, which is the typical colour of a calcium aluminate refractory brick after firing.

Example 9

The base metal slag in this example was generated by a new "flash furnace smelter" instead of the usual reverbatory furnace and, because of the nature of the furnace characteristics, the slag contained substantially more Cu, Ni and Co, as shown in the following analysis comparison (in weight %)

|  | New Flash Furnace | Reverbatory Furnace |
| --- | --- | --- |
| Fe | 36 | 36 |
| Si | 15 | 15 |
| Cu | 0.8 | 0.2 |
| Ni | 1.0 | 0.4 |
| Co | 0.22 | 0.2 |

The objective of this example is to show that, in adding the amount of the Al reductant as in Example 2, the recovery of the Cu, Ni and Co was complete, thus showing that the valuable metal components of the slag are preferentially recovered with the minimum of Al, and any further additions of Al as shown in Examples 3,4,5, and 6 only add additional iron and silicon to form Fe.Si.

The materials charged for the melt were:

| Smelter Slag | 100 g | New Product Slag | 102 g |
| --- | --- | --- | --- |
| Aluminum | 10 g | Metal Button | 26 g |
| Calcium Oxide | 20 g |  | 128 g |
|  | 130 g |  |  |

| Analysis of Metal Button (% by weight) | Analysis of New Product Slag (% by weight) |
| --- | --- |
| Fe | 85 | 15 |
| Si | 4 | 14 |
| Cu | 2.84 | 0.02 |
| Ni | 3.86 | 0.08 |
| Co | 0.88 | 0.02 |

Note: Al, Ca omitted from analysis as not required in example.

Calculations show that over 95% of Cu, Ni and Co reported to the metal button, thus providing a method of maximizing the recovery of Cu, Ni and Co at the minimum of cost in a situation whereby high amounts of Fe.Si are not required, or where a second stage is required to produce FeSi essentially free of Cu, Ni; and Co.

Other embodiments of the invention will be readily available to a person skilled in the art, the scope of the invention being defined in the appended claims.

I claim:

1. A method of recovering metals and producing a secondary slag from base metal smelter slag produced by a copper or nickel smelter, said smelter slag comprising iron silicate and other metallic compounds and elements including (by weight):

from about 15% to about 40% $SiO_2$ from about 1% to about 8% $Al_2O_{3[s]}$ from about 35% to about 60% $Fe_2O_3$ from about 2% to about 20% CaO from about 1% to about 3% MgO from about 0.2% to about 1% Cu (when from a copper smelter)

from about 0.1% to about 1% Ni (when from a nickel smelter)

from about 0.1% to about 0.3% Co from about 0.2% to about 2% S said method comprising: mixing the smelter slag with at least one reducing agent selected from the group consisting of carbon and aluminum, said carbon being from about 1% to about 10% by weight of the slag and said aluminum being from about 5 to about 30% by weight of the slag, and with from zero to about 60% calcium oxide by weight of the slag, and heating the mixture above a eutectic melting point thereof to reduce the iron silicate to ferrosilicon containing copper, nickel or cobalt which was in the smelter slag and thereby also produce a secondary slag comprising at least one compound selected from the group consisting of calcium silicate, calcium aluminate and calcium iron aluminum silicate, and separating the ferrosilicon from the secondary slag.

2. A method according to claim 1 wherein the base metal smelter slag is poured in a molten state into a refractory lined vessel containing a prepared mixture of said reducing agent and calcium oxide in the required amounts to produce said ferrosilicon and said secondary slag.

3. A method according to claim 1 wherein said reducing agent comprises carbon which together with said smelter slag and said calcium oxide is melted in a furnace to produce said ferrosilicon and said secondary slag comprising calcium silicate.

4. A method according to claim 1 wherein the said reducing agent is in the form of aluminum metal and smelter slag is poured in a molten stage over said reducing agent in a fused alumina lined pit.

5. A method according to claim 1 further comprising adding scrap iron to the smelter slag and reducing agent.

6. The method according to claim 1 wherein the method is conducted in two stages by first adding a minimum amount of reducing agent sufficient to produce a metal phase comprising iron containing about 95% of the contained copper, nickel or cobalt, removing this metal phase, and then adding more reducing agent to produce ferrosilicon free of copper, nickel or cobalt and said secondary slag comprising calcium aluminate or a calcium iron aluminum silicate compound.

* * * * *